United States Patent [19]
Zachrai

[11] Patent Number: 6,070,957
[45] Date of Patent: Jun. 6, 2000

[54] DEVICE FOR FASTENING A SUPPORT RAIL ON FRAME LEGS AND MOUNTING PANELS OF A SWITCHGEAR CABINET

[75] Inventor: Jürgen Zachrai, Dillenburg, Germany

[73] Assignee: Rittal-Werk Rudolf Loh GmbH & Co. KG, Herborn, Germany

[21] Appl. No.: 09/047,140

[22] Filed: Mar. 24, 1998

[30] Foreign Application Priority Data

Mar. 25, 1997 [DE] Germany ............ 197 12 362

[51] Int. Cl.[7] .................................. A47B 88/00
[52] U.S. Cl. .................. 312/334.4; 312/265.1; 312/265.2
[58] Field of Search .......... 312/334.4, 334.5, 312/265.1, 265.2, 265.3, 265.4, 265.5; 248/906, 243; 211/151, 186, 187, 190

[56] References Cited

U.S. PATENT DOCUMENTS

| | | | |
|---|---|---|---|
| 3,307,894 | 3/1967 | Collier | 312/265.2 |
| 3,976,014 | 8/1976 | Brown | 312/265.1 X |
| 4,973,110 | 11/1990 | Nyquist | 312/265.2 X |
| 5,228,762 | 7/1993 | Mascrier | 312/265.1 X |
| 5,713,651 | 2/1998 | Essig et al. | 312/265.4 |
| 5,833,337 | 11/1998 | Kofstad | 312/334.4 X |
| 5,938,302 | 8/1999 | Anderson et al. | 312/223.1 |
| 5,941,621 | 8/1999 | Boulay et al. | 312/334.4 |

FOREIGN PATENT DOCUMENTS

| | | |
|---|---|---|
| 7023373 | 6/1970 | Germany . |
| 19507437 | 5/1996 | Germany . |

OTHER PUBLICATIONS

Rittal Handbuch 28, pp. 515–516 (1994).

*Primary Examiner*—Peter M. Cuomo
*Assistant Examiner*—Stephen Vu
*Attorney, Agent, or Firm*—Pauley Petersen Kinne & Fejer

[57] ABSTRACT

A device for fastening a support rail on frame legs and mounting panels of a switchgear cabinet. The frame legs have two fastening sides which extend vertically with respect to each other and respectively have a row of fastening holes. Each mounting panel has a row of fastening holes and a folded support strip in an area of a lateral edge. The support rail has on both ends fastening elements which are used for connecting a frame leg or a mounting panel. Assembly of the support rail is considerably simplified and improved by the design of the ends of the support rail and by the use of clamping plates with clamping screws.

10 Claims, 1 Drawing Sheet

DEVICE FOR FASTENING A SUPPORT RAIL ON FRAME LEGS AND MOUNTING PANELS OF A SWITCHGEAR CABINET

BACKGROUND OF THE INVENTION

1. Field of the Invention

This invention relates to a device for fastening a support rail on frame legs and mounting panels of a switchgear cabinet, wherein the frame legs have two fastening sides, which extend vertically with respect to each other and respectively have a row of fastening holes, the mounting panel has a row of fastening holes and a folded support strip in the area of a lateral edge, and the support rail has on both ends fastening elements which are used to connect a frame leg or a mounting panel.

2. Description of Prior Art

In connection with known devices of this type, special clip-in nuts are inserted into fastening holes, and ends of the support rail having fastening bores are bolted together with the clip-in nuts. Besides the specially embodied fastening elements, known devices require a considerable assembly outlay or cost. Often assembly of a known device is more difficult because the support rail is equipped with structural elements or structural components. Furthermore, in some known cases a connection between the support rail and the frame leg or mounting panel is not sufficiently solid.

SUMMARY OF THE INVENTION

It is one object of this invention to provide a device of the type mentioned at the outset, which makes the attachment of the support rail to frame legs or mounting panels considerably easier and results in a solid connection of the support rail with the frame legs or mounting panels.

This object is attained in accordance with this invention wherein the fastening elements of the support rail are embodied as suspension hooks, having a width matched to a lateral length of the fastening holes, which have a square shape, of the frame legs or the mounting panel, which can be inserted into the fastening holes to extend behind the frame leg or the mounting panel. A clamping plate, which has holding claws on one edge, is assigned to each end of the support rail. The holding claws can be inserted in fastening holes of the side of the frame legs extending perpendicularly with respect to the occupied frame leg side to extend behind the frame leg or extend behind the holding strip of the mounting panel. The clamping plate has a threaded bore for a clamping screw, by which the clamping plate is held on the support rail in an elongated hole extending in the longitudinal direction of the support rail and in the connecting position can be clamped against the clamping plate.

The support rail has suspension hooks which can be suspended in a preparatory manner in the fastening holes of the frame legs and mounting panels, so that the assembler has both hands free for further assembly work. The clamping plates held on the support rail by means of the clamping screws are then inserted into fastening holes of the frame leg, or are brought behind the support strip of the mounting panel.

The elongated holes in the support rail permit adjustment of the clamping plates at the ends of the support rail. When the clamping screws are tightened, the support rail and the clamping plates are clamped against each other, wherein the support rail rests on one fastening side of the frame leg, and the clamping plates act with their holding claws in the fastening holes of the fastening side extending perpendicularly to them.

If mounting panels are used, the support rail rests on the mounting panels, and the holding claws of the clamping plates are supported on the holding strips. In every case the support rail is clamped definitely and with sufficient rigidity on the frame legs and the mounting panels. No special clip-in nuts are required, since the fastening holes only receive the suspension hooks of the support rail and the holding claws of the clamping plates.

In accordance with one embodiment, the support rail with one base leg and two lateral legs is designed with a U-shaped cross section. The clamping plates with one base leg and two lateral legs are designed U-shaped in cross section, and thus form a receptacle for the support rail and can be adjusted in a longitudinal direction. It is thus possible to displace the clamping plates maintained on the support rail into such positions, that the holding claws assume a position which is correct for insertion into the fastening holes of a frame leg or for extending behind the support strip of a mounting panel. The layout is thus selected in accordance with one embodiment so that the fastening holes in the two fastening sides of the frame legs are arranged at equal distances with respect to the frame edge formed by the latter, and so that the width of the holding strip of the mounting panel corresponds to the equal distance.

If the lateral legs of the support rail terminate in support legs which are folded perpendicular with respect to the latter and are oriented toward each other, it is possible to lock electrical devices having an appropriately designed detent base on the support rail in a known manner.

So that the receiving sides of the clamping plates are also clamped over a large area on the facing side of the support rail, in one embodiment the holding claws of the U-shaped clamping plates are disposed on a front face of the base leg, and the holding claws are bent away to correspond to the distance of the fastening holes of the frame legs from the frame edge, and thus the width of the holding strip of the mounting panel at the base leg of the clamping plates.

In accordance with one embodiment, pre-assembly of the support rail on the frame legs or the mounting panel can be improved when the support rail and the clamping plates have two suspension hooks, or respectively two holding claws, in a transverse direction with respect to the support rail, wherein a distance is matched to the division of the rows of fastening holes in the frame legs and mounting panels.

Sliding the clamping plates on the support rail is simplified because the clamping plates have a folded handling strip on the front faces of the base leg located opposite the holding claws.

BRIEF DESCRIPTION OF THE DRAWINGS

This invention will be explained in more detail by way of an exemplary embodiment represented in the drawings.

The single drawing of FIG. 1 represents an exploded perspective view of one exemplary embodiment of this invention.

DESCRIPTION OF PREFERRED EMBODIMENTS

Figure 1:
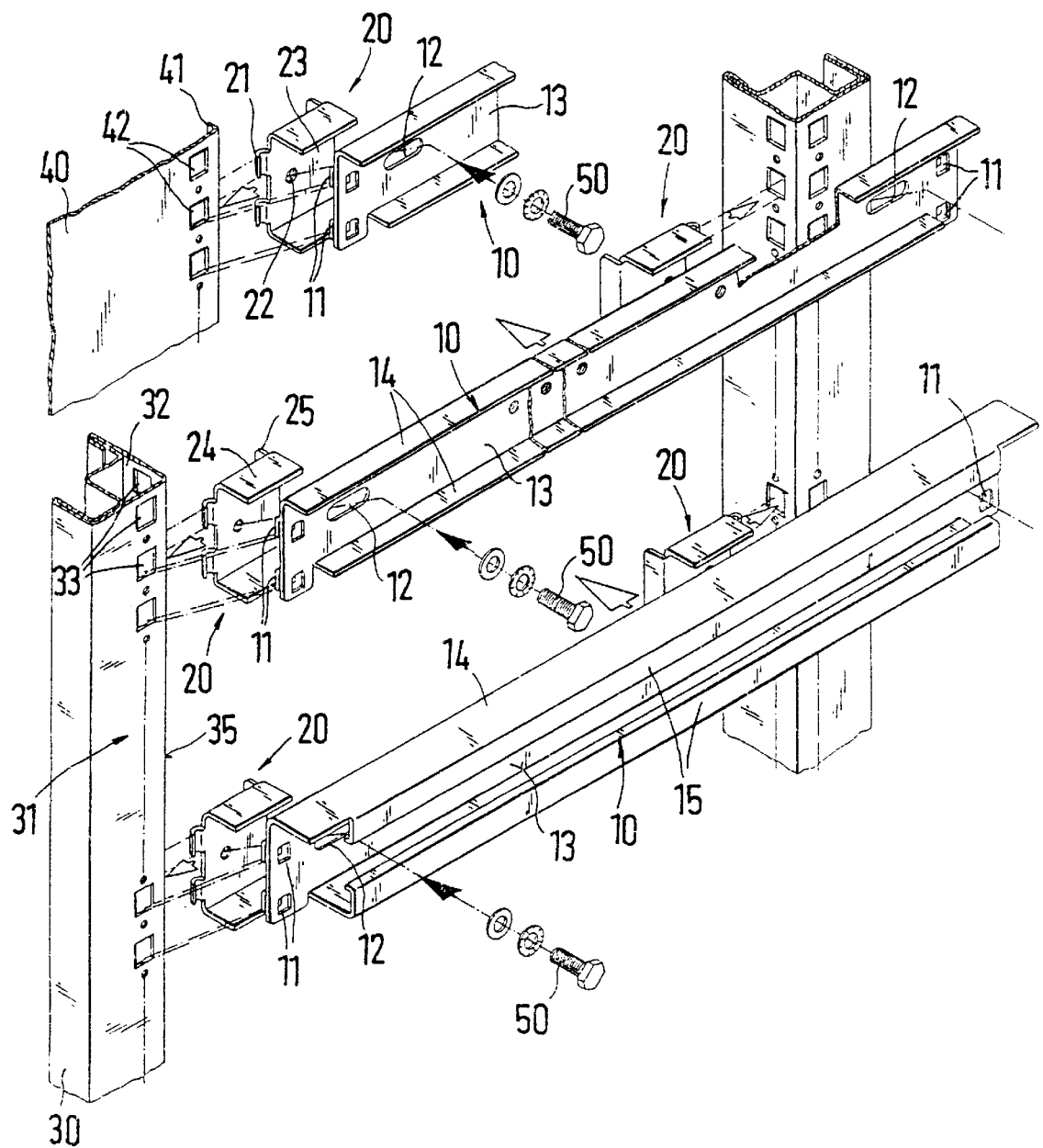

In the drawing, support rails 10 are intended to be fastened between two vertically extending frame legs 30. The support rail 10 can have a base leg 13 and two lateral legs 14 forming a U-shaped cross section, and can have fastening receptacles, such as bores or threaded bores. As shown by means of the lower support rail 10, the lateral legs 14 can also terminate in support legs 15 oriented toward each other, so that the support rail 10 can be used as a locking rail.

The two ends of the support rail 10 are identically designed and respectively have two stamped out and backwardly bent suspension hooks 11. In an area of a frame edge 35, the frame legs 30 have a row of fastening holes 33 in the two fastening sides 31 and 32 extending perpendicularly with respect to each other. The rows of fastening holes 33 are aligned with each other, are cut with uniform spacing, and are at the same distance from the frame edge 35 in both fastening sides 31 and 32. As shown in the upper left area of the drawing, it is also possible to use mounting panels 40, which have an identical row of fastening holes 42 which are located at a same distance from the lateral edge of the mounting panel 40. A holding strip 41, with a width that corresponds to the distance of the fastening holes 42 from the lateral edge of the mounting panel 40, is perpendicularly bent away from the lateral edge of the mounting panel 40.

The suspension hooks 11 of the support rail 10 are matched to the square fastening holes 33 and 42 and are placed at the distance of the rows of fastening holes 33 and 42. The support rail 10 then can be easily suspended on the spaced-apart frame legs 30 or mounting panels 40. In this case the suspension hooks 11 are laid out in such a way that the suspension hooks 11 can be inserted into the fastening holes 33 and 42 and suspended therein. In a preparatory mounting position, the support rail 10 can be pre-attached to the frame legs 30 or the mounting panels 40.

Longitudinally directed elongated holes 12 are disposed on both ends of the base leg 13 of the support rail 10, through which a clamping screw 50 is guided. The clamping screw 50 can be screwed into the threaded bore 22 of a clamping plate 20 cut into the base leg 23 of the clamping plate 20, which with the lateral legs 24 is also U-shaped. The U-shaped clamping plates 20 form receptacles for the U-shaped support rail 10, and can be axially adjusted to a limited extent on the latter when the clamping screws 50, which are guided in the elongated holes 12 and screwed together with the clamping plates 20, hold the clamping plates 20 on the support rail 10 in a preparatory manner. The front faces of the base leg 23 of the clamping plates 20 facing the frame legs 30 or the mounting panels 40 have two holding claws 21, which can be designed similar to the suspension hooks 11 of the support rail 10 and can be introduced into the fastening holes 33 of the fastening side 32 of the frame leg 30, and in the process extend behind the fastening side 32. When fastening the support rail 10 on the mounting panel 40 takes place, the holding claws 21 of the clamping plates 20 extend behind the holding strip 41. The holding claws 21 are respectively bent backward in relation to the receiving side of the clamping plate 20 for the support rail 10.

If the clamping screw 50 is tightened, the back of the support plate 10 is clamped in an area of ends of the support plate 10 against the fastening side 31 of the frame leg 30, or against the front of the mounting panel 40. The clamping plates 20 are pulled against the back of the support plate 10, in the process of which the holding claws 21 are supported in the fastening holes 33 of the fastening side 32 of the frame leg 30 or on the holding strip 41 of the mounting panel 40. This results in a rigid fastening of the support rail 10, for which only a single clamping screw 50 is required per its end.

The support rail 10, together with the two clamping plates 20, form a pre-assembled unit, since the clamping screws 50 hold the clamping plates 20 in place on the support rail 10. After suspending this pre-assembled unit, the clamping plates 20 are merely brought into a connection position and the holding claws are introduced into fastening holes 33 of a frame leg 30, or supported on the holding strip 41 of a mounting panel 40. Assembly is terminated by tightening the clamping screw 50.

The front face of the identically embodied clamping plates 20 facing away from the holding claws 21 is folded to form a handling strip 25, which simplifies displacing the clamping plates 20 along the support rail 10. The displacement distances of the clamping plates 20 are limited by the clamping screws 50 guided in the elongated holes 12 of the support rail 10.

We claim:

1. In a device for fastening a support rail on a plurality of frame legs and a plurality of mounting panels of a switchgear cabinet, wherein the frame legs each have two fastening sides extending vertically with respect to each other and respectively have a row of first fastening holes, the mounting panel has a row of second fastening holes and a folded support strip in an area of a lateral edge, and wherein the support rail has on both ends fastening elements for connecting one of the frame legs or one of the mounting panels, the improvement comprising:

the fastening elements of the support rail (10) each formed as a suspension hook (11) having a width matched to a lateral length of each of the first and the second fastening holes (33, 42) which has a square diameter and which can be inserted into the first and the second fastening holes (33, 42) and extend behind one of the frame leg (30) and the mounting panel (40);

a clamping plate (20) having a plurality of holding claws (21) on one edge assigned to each end of the support rail (10);

the holding claws (21) insertable into the first fastening holes (33) of a frame leg side (32) extending perpendicularly with respect to an occupied frame leg side (31) and extending behind one of the frame leg (30) and the holding strip (41) of the mounting panel (40); and the clamping plate (20) having a threaded bore (22) accommodating a clamping screw (50) holding the clamping plate (20) on the support rail (10) in an elongated hole (12) extending in a longitudinal direction of the support rail (10) and in a connecting position being clamped to the clamping plate (20), wherein the holding claws (21) of the U-shaped clamping plates (20) are disposed on a front face of the plate base leg (23), and the holding claws (21) are bent away to correspond to a distance of the fastening holes (33) of the frame legs (30) from the frame edge (35) and to correspond to the width of the holding strip (41) of the mounting panel (40) at the base leg (23) of each of the clamping plates (20).

2. In a device in accordance with claim 1, wherein the support rail (10) has two suspension hooks (11) and the clamping plates (20) each have two of the holding claws (21), in a transverse direction with respect to the support rail, wherein a distance is matched to a division of the rows of the first and the second fastening holes (33, 42).

3. In a device in accordance with claim 1, wherein the support rail (10) has one rail base leg (13) and two rail lateral legs (14) forming a first U-shaped cross section, the clamping plates (20) each has one plate base leg (23) and two plate lateral legs (24) forming a second U-shaped cross section, and form a receptacle in which the support rail (10) can be adjusted in the longitudinal direction.

4. In a device in accordance with claim 3, wherein the first fastening holes (33) in the two fastening sides (31, 32) of the frame legs (30) are arranged at equal distances with respect to a frame edge (35) of each of the frame legs, and a width of the holding strip (41) of the mounting panel (40) corresponds to each of the equal distances.

5. In a device in accordance with claim 3, wherein the rail lateral legs (14) of the support rail (10) each terminate in a support leg (15) which is bent perpendicular with respect to the rail lateral legs (14) and opposing support legs (15) on the support rail (10) are oriented toward each other.

6. In a device in accordance with claim 5, therein the holding claws (21) of the U-shaped clamping plates (20) are disposed on a front face of the plate base leg (23), and the holding claws (21) are bent away to correspond to the distance of the fastening holes (33) of the frame legs (30) from the frame edge (35) and to correspond to the width of the holding strip (41) of the mounting panel (40) at the base leg (23) of each of the clamping plates (20).

7. In a device in accordance with claim 6, wherein the support rail (10) has two suspension hooks (11) and the clamping plates (20) each have two of the holding claws (21), in a transverse direction with respect to the support rail, wherein a distance is matched to a division of the rows of the first and the second fastening holes (33, 42).

8. In a device in accordance with claim 7 wherein the clamping plates (20) each has a folded handling strip (25) on the front faces of the plate base leg (23) located opposite the holding claws (21).

9. In a device in accordance with claim 3, wherein the clamping plates (20) each has a folded handling strip (25) on front faces of the plate base leg (23) located opposite the holding claws (21).

10. In a device for fastening a support rail on a plurality of frame legs and a plurality of mounting panels of a switchgear cabinet, wherein the frame legs each have two fastening sides extending vertically with respect to each other and respectively have a row of first fastening holes, the mounting panel has a row of second fastening holes and a folded support strip in an area of a lateral edge, and wherein the support rail has on both ends fastening elements for connecting one of the frame legs or one of the mounting panels, the improvement comprising:

the fastening elements of the support rail (10) each formed as a suspension hook (11) having a width matched to a lateral length of each of the first and the second fastening holes (33, 42) which has a square diameter and which can be inserted into the first and the second fastening holes (33, 42) and extend behind one of the frame leg (30) and the mounting panel (40);

a clamping plate (20) having a plurality of holding claws (21) on one edge assigned to each end of the support rail (10);

the holding claws (21) insertable into the first fastening holes (33) of a frame leg side (32) extending perpendicularly with respect to an occupied frame leg side (31) and extending behind one of the frame leg (30) and the holding strip (41) of the mounting panel (40); and the clamping plate (20) having a threaded bore (22) accommodating a clamping screw (50) holding the clamping plate (20) on the support rail (10) in an elongated hole (12) extending in a longitudinal direction of the support rail (10) and in a connecting position being clamped to the clamping plate (20), wherein the support rail (10) has one rail base leg (13) and two rail lateral legs (14) forming a first U-shaped cross section, the clamping plates (20) each has one plate base leg (23) and two plate lateral legs (24) forming a second U-shaped cross section, and form a receptacle in which the support rail (10) can be adjusted in the longitudinal direction, the rail lateral legs (14) of the support rail (10) each terminate in a support leg (15) which is bent perpendicular with respect to the rail lateral legs (14) and opposing support legs (15) on the support rail (10) are oriented toward each other.

* * * * *